May 31, 1966    R. A. GARLING    3,253,971
PROCESS OF PRODUCING PRODUCT WITH A REFLECTIVE SURFACE
Filed Feb. 23, 1962

3,253,971
PROCESS OF PRODUCING PRODUCT WITH A
REFLECTIVE SURFACE
Richard Angle Garling, Kent, Ohio, assignor to The Firestone Tire & Rubber Company, Akron, Ohio, a corporation of Ohio
Filed Feb. 23, 1962, Ser. No. 175,108
4 Claims. (Cl. 156—246)

This invention relates to the process of producing a product with a reflective surface and particularly a surface which reflects a light beam in the dark, such as a traffic warning.

The use of "Lucite" (methacrylate ester) and other plastic beads as reflectors in traffic markings has been suggested in a limited way. The invention relates to the improved use of such beads.

According to this invention, plastic beads or fragments (both referred to herein as reflective plastic bits) are used although the invention will be described more particularly in connection with the use of beads. (In this specification "plastic" will be used in its commercial sense to refer to an organic composition and to distinguish from glass.) The plastic beads are bonded to a base and preferably also to one another. Such bonding makes a relatively permanent reflective surface. The beads when so bonded are not easily separated from the base or each other especially if the bond is formed to an elastomeric material. If bonded to one another the beads form a continuous pebbly surface over all or any part of the marker or other article. Differently colored beads may be used in segregated areas of a marker surface, and the beads in each such area may be united side by side into a pebbly surface.

The beads may be applied to a freshly applied coating having a plastic base, such as a painted traffic stripe or area on a concrete or asphalt, etc. pavement, or a metal abutment, or on a billboard or other sign, etc. Alternatively, the article may be preformed by applying the beads to one surface of a plastic base and thereafter applying the base to a pavement or other surface. Such a preformed marker or other article may be marketed with an adhesive covering the non-beaded surface of the base. If a pressure-sensitive adhesive is used a release sheet is advantageously applied over the adhesive. Alternatively, the adhesive may be one which is dry and can be activated by heat or solvent when the sheet is to be applied to the pavement or some other body.

The preferred markers, etc. which are subsequently positioned by adhesive, may be made by any suitable factory methods. Thus, heat may be used to attach the beads in a way that it is impractical to use it on a highway. Thus the beads may be heat-sealed to a plastic base and to one another. Also in a plant, solvent-recovery systems are feasible whereas they will not be used on a highway. The beads are advantageously placed so close together that they may be united to adjacent beads, either by heat or solvent or both.

Although generally the beads will be spread on the base of the marker, etc., the beads may be spread on any suitable surface and the base then pressed down onto the beads. Sufficient pressure may be used to flatten the beads at least to some extent and thereby alter the pattern of light reflected from the beads.

The bits are composed of any reflective plastic that can be fused to the base, either by heat alone, or with solvent, or with solvent and heat. The solvent for the bits may be one of the components of an adhesive. If solvent is used for adhesion, the bits are united to the base by a solvent or solvent-containing adhesive that bonds to the base. Both the bits and the base are plastic and the solvent forms a fusion bond between the bits and the base and preferably also between adjacent bits.

By a "fusion bond," we refer to a bond between a reflective bit and another plastic which at the interface between the materials being joined contains some of the adjacent bit material. At the interface between two bits of the same composition it may contain only the reflective bit material. If the bits are of different compositions, it contains some of each. At the interface between a bit and a base, it contains some of each. In addition, it may contain added adhesive, etc.

Although usually a solvent will be present during the bonding of the beads to the base, heat alone can be used. If reflective fragments are used instead of beads, their exposed portions may be fused to some extent and any sharp angles thereof may be dulled during the heat fusion. For example, the entire top surface of a preformed base (whether a plastisol, an organosol or a plastic of uniform composition is used) may be uniformly heated, as by a radiant heater, and the beads may then be spread on the heated surface. Preferably, heat is applied to the beads after they have been spread on the base so as to heat-seal adjacent beads to one another to form a relatively continuous reflective skin.

The degree of heat utilized ill be regulated to satisfy the flow and fusion properties of the beads without entirely melting the beads or causing them to be entirely dissolved into the base. The beads may be heat sealed to one another after being attached to the base, by a second heating operation, whether the base be preformed, or formed in situ on a pavement or the like. The bond between the beads and the base is of sufficient strength to prevent easy delamination or separation from the base.

The reflective beads or other bits may, for example, be composed of a vinyl plastic (e.g. polymers of vinyl chloride, vinyl acetate, vinyl chloride-acetate, vinyl acetate-stearate, etc.), an acrylic plastic (e.g. polymers of methyl acrylate, methyl methacrylate, etc.), polystyrene, cellulose esters, polyesters, epoxy resins, etc. Other thermoplastics and other thermoset plastics may be used.

Any one or more of the foregoing plastics may be used in the base, whether the base be preformed or applied to a pavement or the like as a solution. For instance, the base may be a vinyl plastic, an acrylic plastic, a cellulosic ester, an epoxy resin, etc. or it may be an alkyd or modified alkyd resin, or asphaltic material, etc. For polystyrene beads, epoxy or styrenated bases are quite satisfactory. Mixed plastics will ordinarily be used for the base, and the reflective bits may be a mixed plastic. Plastisols are very satisfactory for preparation of preformed bases and for bases attached to metal or other material in a factory and later positioned to serve as a traffic marker or the like. When a plastisol is used the beads are preferably applied to the base before the plastisol is heated to solvate the plasticizer into the resin. In such case the heat is preferably applied so as to simultaneously bond the beads to the resin, as by heat fusion, and preferably also to simultaneously bond the beads to one another. The plastisol may contain a resin that is not compatible with the plasticized resin formed on heating the plastisol and exudes to the surface of the plastic as an adhesive and bonds the beads to it.

Almost any organic material classified commercially as a plastic can be used for the base. The nature of the base may depend upon the surface to which it is applied. If the base is to be applied to a bridge wall, for example, it may be relatively hard, whereas for ordinary use where traffic is apt to run over it, a more flexible material will generally be desirable, and it may contain a filler. Curing agents may be included in compositions to be used for bases which contain a rubber, an epoxy resin or other curable material.

The bits in any one marker, etc. may all be of substantially the same size, or different sizes may be used. Generally they will be 0.005 to 0.5 inch in their largest dimension, although their size is not critical.

Being plastic, the reflective bits will be relatively wear resistant and protect the base. They will have a much longer life as constituent parts of the marker than glass beads or bits because when bonded to the base by fusion (either solvent or heat), they will not be readily separated from the base. Further, if each bead is bonded to adjacent beads the danger of their becoming separated from the base is greatly reduced.

The reflective bits and the base or either one can be colored with pigment and/or a dye.

EXAMPLE I

The following example is illustrative of the use of vinyl acetate-vinyl stearate copolymer beads which, for example, are all about .010 to .030 inch in diameter. The beads have been known commercially as Flexbond D-44 or Flexbond D-13, marketed by Colton Chemical Company, a division of Air Reducton Company.

The base is prepared from the following plastisol:

| | Parts |
|---|---|
| Vinyl chloride (dispersion grade) | 100 |
| Dioctyl phthalate | 125 |
| Epoxidized soya bean oil | 150 |
| Stabilizer | 3 |
| Titanium dioxide | 150 |

The base is shaped from this plastisol composition. The vinyl acetate-stearate beads are spread upon it in a single layer in touching relation. Then it is baked for 15 minutes at 350° F. to fuse the vinyl resin, and the undersurface and sides of the beads and the plasticized vinyl combination are fused sufficiently at this temperature to bond them to one another. During such baking, the plastic dissolved into the plasticizers (dioctyl phthalate and epoxidized soya bean oil) at the interface making a fusion bond that was elastomeric. Only the under-surface and sides of the beads are solvated so that the unsolvated portion of the beads—which is the major portion—is bonded to the base. The adjacent beads soften and bond to one another forming a fusion bond. The unfused portion of the beads is not adversely affected by the temperature used. In the finished marker, etc. the beads are bonded to the base and to one another by fusion bonds, and it is difficult to separate them.

The plastisol of the foregoing example could be replaced by an organosol by adding hexane or other suitable plasticizer solvent to the formula in Example I.

EXAMPLE II

In this example a resin is added to the plastisol which resin is insoluble in the hot plasticized vinyl and exudes to the surface when the plastisol is heated to solvate the plasticizer into it. The resin may be insoluble in the plastisol, and liquify when the plastisol is heated. It may be soluble in the plasticixer and separate when the plastisol is heated. It forms an adhesive covering over both surfaces of the plasticized resin, so that beads may be adhered to one surface and the other surface may be adhered to metal or the like.

A pressure-sensitive adhesive may be applied to the release paper and the plastisol can be cast on to this, or a pressure-sensitive adhesive can be added to the preformed sheet after removal of the release paper. Instead of applying the pressure-sensitive adhesive to the preformed sheet, any suitable adhesive may be applied directly to the surface to which the marker, etc. is to be attached and the preformed sheet may be applied to this.

The following formula illustrates a plastisol which may be cast either as a free film in any desired thickness to serve as a preformed marker, etc. or it may be applied in situ to metal or the like by spraying, brushing, rollercoating or the like.

| | Parts by weight |
|---|---|
| Vinyl dispersed resin (plastisol grade) | 34 |
| Epoxidized plasticizer (monomeric) | 15 |
| Di-2-ethylhexyl phthalate | 10 |
| Epoxy resin* | 12 |
| Pigments and fillers | 24 |
| Nitrile rubber (liquid) | 3 |
| Dicyandiamide | 1.0 |
| Dicumyl peroxide | 0.12 |
| Barium-cadmium stabilizer | 0.7 |

* Epoxide equivalent weight=190.

On heating the foregoing plastisol to solvate the plasticizers into the resin, the epoxy resin exudes to the surfaces, which are cured on further heating. The following represent two possible applications of this plastisol.

A. *Application to metal*

The plastisol is applied to a metal surface by brushing, spraying, rolling or other means, and in the desired thickness, the wet thickness of the applied film generally being 3 to 7 mils. Although the metal surface is usually covered with a continuous film, the plastisol may be spattered on to the surface to provide reflection of light from a non-continuous area.

The beads or other bits are preferably vinyl acetate-vinyl stearate copolymer, but may be of other plastic composition. They are sprinkled on to the applied coating and if the coating is continuous the coated object may be vibrated to distribute the beads uniformly over the surface. Any excess number of beads are removed as by inverting the object. Vacuum or air pressure can be employed for such removal.

The object is then baked in a circulating-air oven for 20 minutes at 365° F. The plasticizers are solvated into the vinyl resin, and the epoxy resin exudes to the surfaces of the film. During this heating, the epoxy resin is cured and forms a bond with the beads at one surface and bonds the film to the metal at the other surface.

B. *Preparing preformed marker, etc.*

The plastisol is applied to a release paper or other surface, as by knife coating, to give a film of any desired thickness, generally 10 to 25 mils. The bits are sprinkled on the exposed surface, and preferably distributed by vibration. The excess beads are then removed in any suitable manner.

The film is preheated to 200° F. for 5 minutes to set the plastisol, and the temperature is then raised to 365° F. for 20 minutes. The resin exudes to the surfaces and during this heating cycle the epoxy resin is cured and bonds the plastic bits to one surface of the vinyl base. The release paper is subsequently removed when the preformed marker or the like is attached to a pavement, etc.

Many other base compositions can be used. It is not necessary to employ a plastisol. For instance, the marker may be painted on as a lacquer that contains a weak solvent for the beads, which forms a bond with them before it is evaporated. On the other hand, the bond may be heat-formed in the absence of solvent.

The invention is further described in connection with the accompanying drawings, which are quite schematic:

Figure 1:
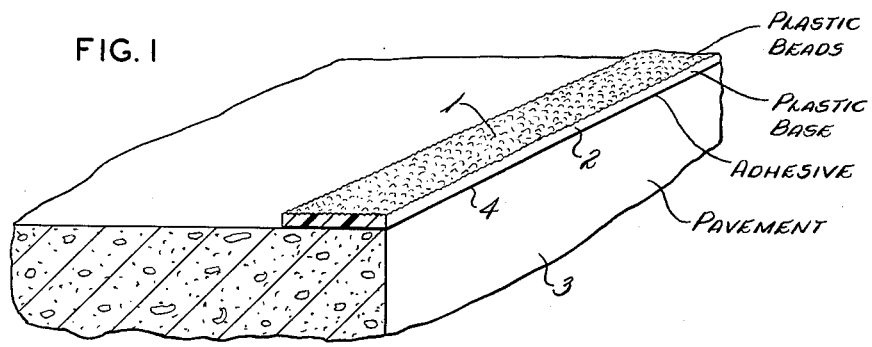
FIGURE 1 is a section through a pavement coated with a marker.

In FIGURE 1, the marker which is preformed and includes reflective plastic bits 1, may be prepared as described in the foregoing illustrative examples. The base 2 is, for example, .015 to .030 inch thick, and is applied to the pavement 3 by an adhesive which forms a good bond with both the base and the pavement. The adhesive 4 may, for example, be a nitrile-phenolic solvent base cement.

Figure 2:
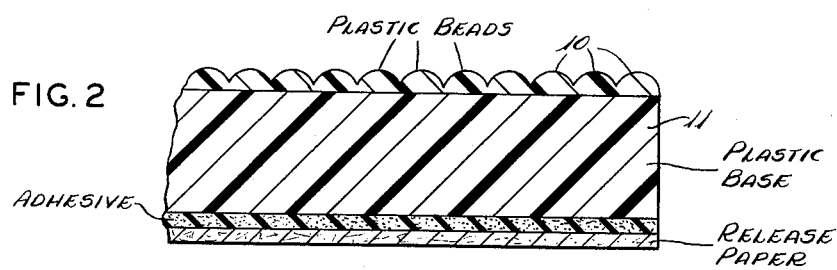
FIGURE 2 is an enlarged section through a marker.

FIGURE 2 is an enlarged section through a preformed marker prepared by either Example I or Example II in which the beads 10 have been fused to the base 11. Also, sufficient heat was used to fuse surfaces of adjacent beads to one another so that the beads form a substantially continuous pebbly surface. Although fusion with the use of heat has been described, it is to be understood that the beads can be fused to the base with solvent, with or without heat.

As an alternative procedure, an enamel or lacquer using a ketone solvent, for example, is applied to the pavement and the beads are sprinkled over this while there is still just sufficient unevaporated solvent to effect the desired solution of the beads and bond them to the dissolved vehicle and to one another. The remaining solvent will quickly dry into the atmosphere, leaving the desired fusion bond between the various beads and between the beads and the base.

Figure 3:
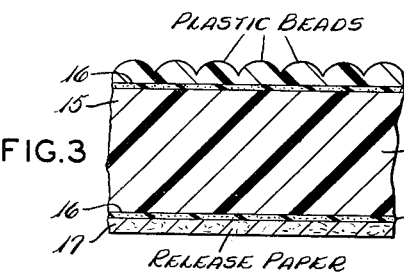
FIGURE 3 is an enlarged section through a marker preformed on a release paper.

FIGURE 3 illustrates a preformed marker or the like made from a plastisol such as that described in Example II. On heating, the plasticizers are solvated into the vinyl resin to form the base 15, and the epoxy resin exudes to the surfaces of the base and forms thin coatings 16. Beads are spread over the top of the base before heating, and on heating the beads fuse to one another and to the coating 16. This forms a pebbly surface over the entire upper surface of the base 15. The epoxy layer 16 which exudes to the bottom surface of the base is prevented from adhering to the supporting surface by covering this surface with the release paper 17. The release paper is subsequently removed when the preformed marker or the like is attached to a pavement, a bridge, a billboard back or the like.

Figure 4:
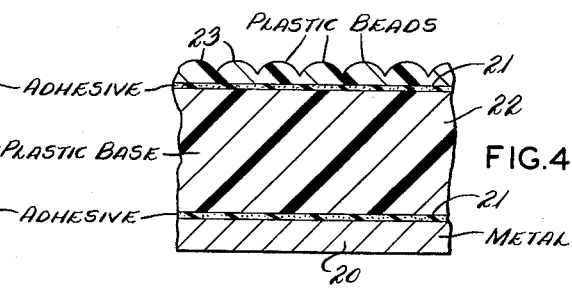
FIGURE 4 is an enlarged section of a marker on a metal base.

FIGURE 4 illustrates the application of the plastisol of Example II directly to a metal 20. The metal may be steel, copper, aluminum, an alloy, etc. When the applied plastisol is heated the epoxy resin 21 exudes to the surfaces of the plasticized resin base 22. The bottom surface is adhered to the metal and beads 23 on the top surface fuse and are adhered thereto by the coating 21. The assembly is preferably heated to such a temperature that on softening, adjacent beads are fused to one another.

Figure 5:
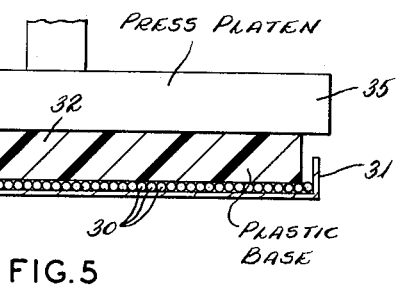
FIGURE 5 illustrates one way of producing a marker.

FIGURE 5 illustrates an alternative procedure. The beads 30 are spread one-deep in a pan 31. A base 32 with an adhesive undersurface is pressed on to the beads. The bottom is adhesive either because the entire base is produced from a solution of plastic in solvent which has not yet entirely evaporated, or because it is formed from a plastisol that includes an adhesive resin that exudes to the surface when the plastisol is heated, or because solvent (which may contain adhesive) has been applied to the bottom of a dry base.

For a vinyl acetate base a blend of ketone solvents will be satisfactory for making the bottom adhesive. For a polystyrene base, a weaker solvent will ordinarily be used.

Instead of merely spreading the beads at random in a pan, they may be adhered one-deep, to a release paper, and the base then pressed on to them.

In such an operation as suggested by FIGURE 5, after the plastisol has set the press platen 35 may exert sufficient pressure to flatten the exposed surface of the beads somewhat. The reflection of the light from the surface of the partially flattened beads varies somewhat from that from rounded beads. This procedure makes possible the formation of a beaded pattern which can include lines, arrows, letters, numbers or the like in areas having a different color or different reflective index from the surrounding area (whether or not that surrounding area is formed of beads). Furthermore, patterns can be made by flattening beads in certain areas and not in other areas, using techniques which readily suggest themselves to the man skilled in the art.

The use to which the marker is to be put will determine the preferred bead composition. Beads are selected with respect to melting point, refractive index, color, solubility and clarity. The base will be selected to give a firm fusion bond with beads of the composition selected, and to give a base of desired properties.

What I claim is:

1. The process of making a reflective product which comprises making a film of a plastisol containing plasticizer and a first resin, which plastisol also contains a second resin which is adhesive and incompatible in the plasticized first resin when the plastisol is heated to solvate the plasticizer in the first resin, heating the plastisol to solvate the plasticizer in the first resin and thereby cause the second resin to exude to a surface of the resulting plasticized first resin, and applying plastic bits to said surface.

2. The process of claim 1 in which the second resin is a heat-curable resin and is cured after the bits are in contact with it.

3. The process of preforming a marker with a reflective surface which comprises applying to a release paper a plastisol containing plasticizer and a first resin which plastisol also contains a second resin which is incompatible with the plasticized first resin when the plastisol is heated to solvate the plasticizer in the first resin, heating the plastisol to solvate the plasticizer in the first resin, and thereby cause the second resin to exude to both surfaces of the resulting plasticized first resin and to contact the release paper at one of said surfaces, and then adhering plastic bits to the exuded resin on the other surface.

4. The process of forming a marker on a metal surface which comprises applying to the surface a film of plastisol containing plasticizer and a first resin which plastisol also contains a second resin which is incompatible with the plasticized first resin when the plastisol is heated to solvate the plasticizer in the first resin, spreading plastic bits over the exposed surface of the plastisol film, heating the plastisol to solvate the plasticizer in the first resin and thereby cause the second resin to exude to both surfaces of the resulting plasticized first resin and form a bond with said bits.

References Cited by the Examiner

UNITED STATES PATENTS

| | | | |
|---|---|---|---|
| 2,218,909 | 10/1940 | Gill | 117—35 |
| 2,430,534 | 11/1947 | Rodli | 156—242 |
| 2,494,848 | 1/1950 | Whitelegg | 156—298 X |
| 2,523,759 | 9/1950 | Grant | 117—126 |
| 2,761,177 | 9/1956 | Walters | 156—279 |
| 2,904,918 | 9/1959 | Frank | 156—279 X |

EARL M. BERGERT, *Primary Examiner.*

V. A. MALLARE, T. I. SAVOIE, *Assistant Examiners.*